O. W. WOOD.
RATCHET PIPE CUTTER.
APPLICATION FILED DEC. 3, 1915.
1,197,247.
Patented Sept. 5, 1916.
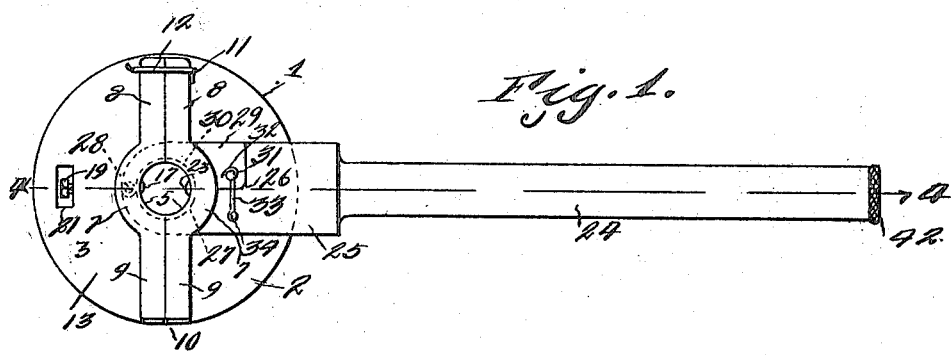
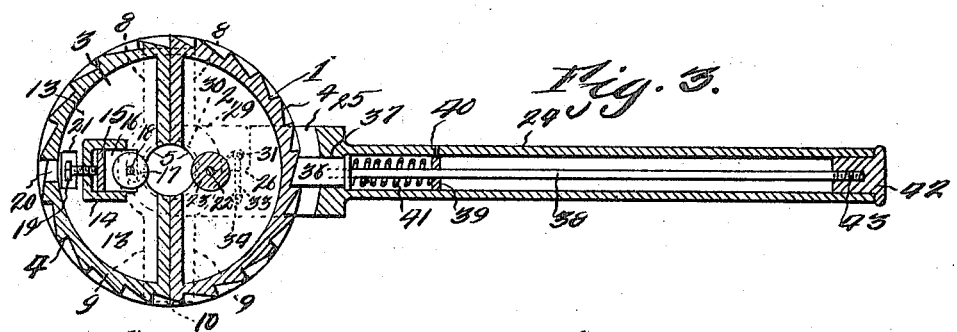
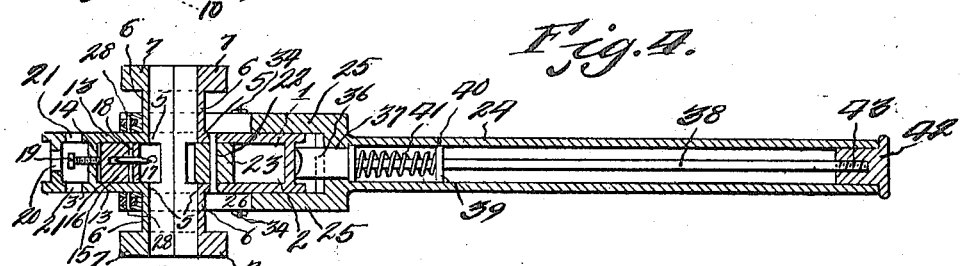
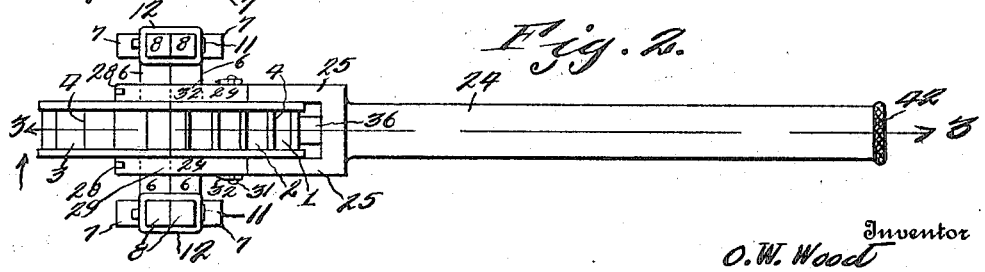
Witnesses
Inventor
O. W. Wood
By D. Swift & Co.
Attorneys

UNITED STATES PATENT OFFICE.

OLIN W. WOOD, OF CORDELL, OKLAHOMA.

RATCHET PIPE-CUTTER.

1,197,247.  Specification of Letters Patent.  Patented Sept. 5, 1916.

Application filed December 3, 1915. Serial No. 64,839.

*To all whom it may concern:*

Be it known that I, OLIN W. WOOD, a citizen of the United States, residing at Cordell, in the county of Washita, State of Oklahoma, have invented a new and useful Ratchet Pipe-Cutter; and I do hereby declare the following to be a full, clear, and exact description of the invention, such as will enable others skilled in the art to which it appertains to make and use the same.

This invention relates to an improved ratchet pipe cutter, and an object of the invention is to provide a sectional ratchet, the sections of which being provided with lateral bearings, which are hingedly united, there being loops for holding the bearings together, to clamp the bearings and the sections of the ratchet to the end of a pipe, in such a manner that the bearings and the ratchet (which is provided with a pipe cutter on its interior) may turn intermittently on the pipe for cutting the same.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of the ratchet pipe cutter constructed in accordance with the invention. Fig. 2 is a plan view of the pipe cutter. Fig. 3 is a sectional view on line 3—3 of Fig. 2. Fig. 4 is a sectional view on line 4—4 of Fig. 1.

Referring more especially to the drawings, 1 designates a ratchet consisting of two sections 2 and 3, which are hollow, and are provided with ratchet teeth 4. The sections are provided with central semi-cylindrical bearings 5, and extending laterally from the section and adjoining the bearings 5 are semi-cylindrical extensions 6, the outer ends of which terminate in enlargements 7. Extending from the enlargements are laterally extending arms 8 and 9. It is to be noted that there are two sets of arms 9 and two sets of arms 8. The arms 9 are hingedly connected as at 10. Hingedly connected at 11 to one of the arms 8 upon each side of the ratchet is a loop 12 designed to be swung over the adjacent arm 8. The loops 12 constitute means to hold the arms 8 and 9 on both sides of the ratchet clamped together, so as to hold the extension bearings 6 clamped to a pipe to be cut, so that the ratchet and the extension bearings may be turned intermittently on the pipe to be cut. Forming an integral part of the sides 13 of one of the sections of the ratchet is a U-shaped guide 14, in which a radially adjustable block 15 is mounted. The block 15 is held frictionally in the U-shaped guide 14, and is provided with a slot 16 in which a cutting disk 17 is mounted upon the pin 18. The cutting edge of the cutting disk or member 17, as will be seen clearly in Figs. 3 and 4 extends inwardly beyond the periphery of the semi-cylindrical bearing 5 of one of the sections of the ratchet, so as to cut into the pipe (not shown) which may be arranged in the bearing, so that as the ratchet is intermittently rotated, the pipe will be severed. A screw bolt 19 is threaded in the guide 14 and has its inner end bearing against the block. As the cutting member cuts deeper into the pipe, the screw bolt may be turned, to force the block and the cutting member farther toward the pipe to be cut, so that the cutting member will bury deeper into the pipe. To arrange the screw 19 in place the toothed wall of one of the sections of the ratchet is provided with an opening 20, through which the screw bolt may be inserted. The side walls of the section of the ratchet having the guide 14 are provided with openings 21, through either one of which, or through the opening 20, a tool of some suitable kind may be inserted, for turning the two bolts, for adjusting the block.

The hollow section 2 of the ratchet has mounted in its walls a pin 22, on which a roller 23 is journaled. This roller is disposed diametrically opposite the cutting member, so as to engage the pipe to be cut, opposite where the cutting member operates on the pipe. A tubular lever 24 is provided, and which is supplied with forks 25 at one end, and which forks engage opposite sides of the ratchet. As shown in Fig. 1 the upper parts of the forks at their ends are provided with cutaway portions or recesses 26, the bottoms of which are supplied with semi-cylindrical bearings 27 to engage the outer circumferences of the parts or extensions 6, that is, when the two sections of the ratchets are held together as shown in Figs. 1 and 2. Pivoted at 28 in the bifurcated end of the forks 25 are latch plates 29 having semi-cylindrical bearings 30 corresponding to and opposite the bearings 27, which bearings 30 also engage the extensions or parts 6 of the sections of the ratchet. The latch plates are provided with lateral pins 31 to be engaged by the hooks 32 of the latches 33, which are pivoted at 34 to the outer faces of the forks 25, thereby holding the forks swively on the extensions 6 of the ratchet. A dog 36 is mounted in a guide 37 where the tubular lever merges into the forks 25, and which dog coöperates with the ratchet teeth 4 of the ratchet, so as to impart an intermittent motion to the ratchet. The dog 36 has a stem 38 extending through the guide 39, which may be secured in the tubular lever, as shown at 40, there being a coil spring 41 interposed between the dog and the guide 39, to hold the dog yieldably in coöperation with the teeth of the ratchet. A thumb piece 42 is threaded upon the stem as shown at 43, and telescopes into the tubular lever, and by means of the thumb piece, the dog may be withdrawn from engagement with the teeth of the ratchet, so that the lever may be moved freely in either direction.

When the parts of the ratchet and the forks are clamped or arranged in position as shown in Figs. 1 and 3, and on a pipe (not shown), the tubular lever may be moved in one direction, imparting movement to the ratchet, thereby causing the cutter to cut into the pipe. A movement of the tubular lever in the opposite direction will cause the dog to ratchet over the teeth 4, in order that the dog may engage another tooth. Backward and forward movement of the lever is continued until the pipe (not shown) is severed by the cutter.

The invention having been set forth, what is claimed as new and useful is:—

In a device as set forth, a drum comprising two semi-circular hollow drum sections having contacting flat faces, said sections having semi-cylindrical sleeve sections provided with projecting radial arms, and which sleeve sections when brought together forming cylindrical bearings, the contacting flat faces of the sections and the sleeve sections having registering semi-circular recesses to receive a pipe to be cut, the interior of the drum or shell section having a transverse U-shaped guide, a cutter holder including a cutter mounted in the guide, means for adjusting the holder, means for hingedly connecting the projecting radial arms of the sleeve section for hingedly uniting the drum section, swinging loops engaging the non-hinged ends of the projecting radial arms to hold the arms together, and a member fulcrumed upon the cylindrical bearings and provided with means to impart intermittent motion to the drum.

In testimony whereof I have signed my name to this specification in the presence of two subscribing witnesses.

OLIN W. WOOD.

Witnesses:
  G. T. House,
  J. H. Smith.